United States Patent
Yeager et al.

(10) Patent No.: US 8,562,208 B2
(45) Date of Patent: Oct. 22, 2013

(54) CRITICAL TEMPERATURE INDICATOR

(75) Inventors: Steven L. Yeager, Miami Township, OH (US); T. Randall Lane, Lebanon, OH (US)

(73) Assignee: KLT Technologies, Inc., Dayton, OH (US)

( * ) Notice: Subject to any disclaimer, the term of this patent is extended or adjusted under 35 U.S.C. 154(b) by 84 days.

(21) Appl. No.: 13/301,082

(22) Filed: Nov. 21, 2011

(65) Prior Publication Data

US 2013/0128921 A1 May 23, 2013

(51) Int. Cl.
*G01K 11/00* (2006.01)

(52) U.S. Cl.
USPC .......................................................... 374/162

(58) Field of Classification Search
USPC .......................................................... 374/162
See application file for complete search history.

(56) References Cited

U.S. PATENT DOCUMENTS

| | | | |
|---|---|---|---|
| 4,028,944 A * | 6/1977 | Erb | 374/160 |
| 4,457,252 A | 7/1984 | Manske | |
| 5,076,197 A | 12/1991 | Darringer et al. | |
| 5,215,378 A | 6/1993 | Manske | |
| 6,472,214 B2 * | 10/2002 | Patel | 436/2 |
| 6,957,623 B2 | 10/2005 | Guisinger et al. | |
| 7,940,605 B2 * | 5/2011 | Ambrozy et al. | 368/327 |

* cited by examiner

*Primary Examiner* — Harshad R Patel
*Assistant Examiner* — Brandi N Hopkins
(74) *Attorney, Agent, or Firm* — R. William Graham

(57) ABSTRACT

A temperature descending indicator which gives a visual indication when the indicator has been exposed to temperatures below a set threshold temperature includes a container having a translucent portion, a first temperature sensitive gel of a first color which will convert to liquid when it is exposed to temperatures below the set threshold temperature, and a second temperature sensitive gel of a second color which will convert to liquid when it is exposed to temperatures below the set threshold temperature, wherein the second temperature sensitive gel is disposed adjacent the translucent portion in a manner to obscure the visibility of the first temperature sensitive gel. A method of making the indicator includes disposing one color gel over the other.

16 Claims, 1 Drawing Sheet

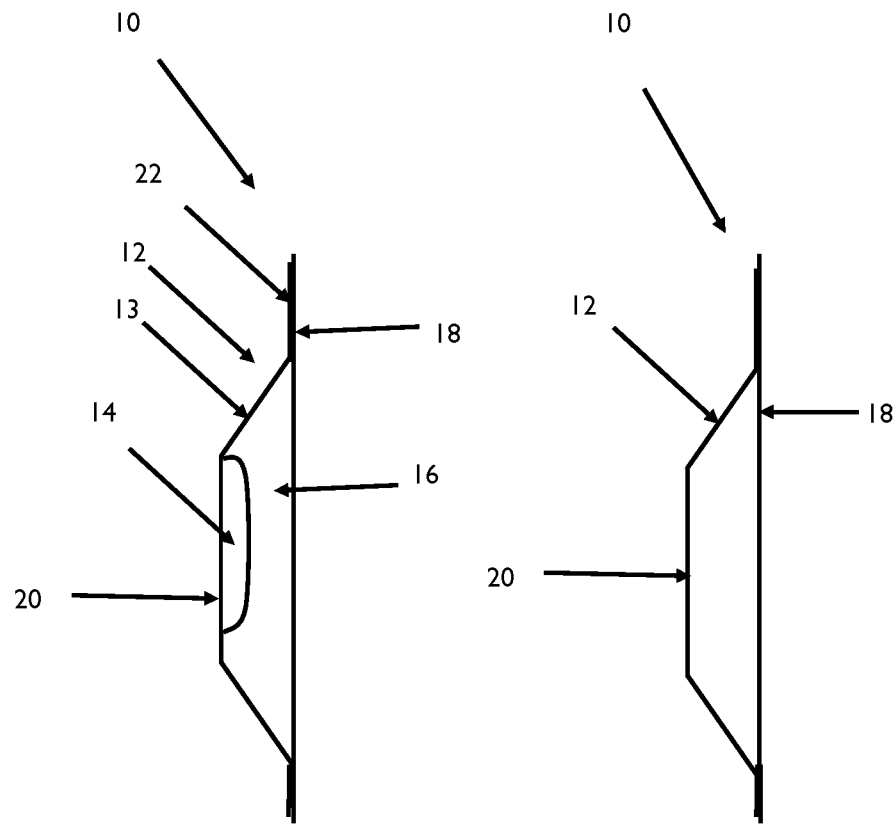

CRITICAL TEMPERATURE INDICATOR

FIELD OF THE INVENTION

This invention relates to a device for indicating a critical temperature has been reached. More particularly, the invention relates to a descending temperature indicator.

PRIOR ART

Determining whether or not a particular good, such as a pharmaceutical or food, is exposed to a predetermined temperature may be of great importance. Devices can be attached to a good to determine whether or not the device, and consequently the good, is exposed to a predetermined temperature.

Such devices employ electronics, paints and coatings that permanently change color once they have been exposed to a predetermined temperature. In the case of chemical, these coatings do not cover a wide enough range of temperatures to be useful in a broad range of applications. Bimetallic components have been used which change shape rapidly and significantly as a result of being exposed to a specified temperature. Other devices employ electronic sensors. Liquid crystals and leuco dyes have also been used for temperature indicators. Liquid crystals are used in precision applications, as their responses can be engineered to accurate temperatures, but their color range is limited by their principle of operation. Leuco dyes allow wider range of colors to be used, but their response temperatures are more difficult to set with accuracy.

One freeze indicator device uses a convex bimetallic disk wherein its outer circumference is wedged into a low-walled, recessed area on the inside of the device housing. On the side of the device housing opposite the recessed area is a viewing window. The apex of the convex disk faces the side of the device which contains the viewing window. However, when the device has not been exposed to the predetermined freeze temperature, the disk cannot be seen in the viewing window.

At one point of the outer circumference of the disk, a compressed spring applies pressure to the disk. When the device is exposed to the predetermined freeze temperature, the bimetallic disk snaps into a concave shape. Its edges are no longer wedged into the recessed area and the spring forces the disk forward, out of the recessed area, such that the disk rests underneath the viewing window. Thus, the disk can be seen in the viewing window and it is clear that the device has been exposed to the predetermined temperature. Additionally, the disk may be painted a distinct color different from the color of the device housing such that it is easy to identify when it is underneath the viewing window.

While some of these devices provide critical temperature indicators, It is desired to improve the art to reduce cost. Also, it is desired to have accurate descending critical temperature detection which is easily visually determined by a human operator whether a particular item has been exposed to a predetermined descending temperature.

SUMMARY OF INVENTION

It is an object to provide a critical temperature indicator.
It is another object to improve descending temperature indicators.
It is another object to provide a gel based temperature sensitive indicator.

Accordingly, one aspect of the invention is directed to a temperature descending indicator that gives a visual indication when it has been exposed to temperatures below its set threshold temperature. A preferred embodiment uses a translucent or clear container, such as a low MVTR film blister, and which is filled with a temperature sensitive gel. The container with gel therein can be then sealed with a foil backing.

The gel in the container will convert to liquid when it is exposed to temperatures below a set threshold. When the gel converts to liquid, a permanent color change occurs from green to red. The color change is accomplished by first loading a first color (e.g. green) gel that contains high density pigments into blister formed in a film to provide a cover or small window in front of the container, so that only green gel is seen when viewing the window. Behind the green gel, the same temperature sensitive gel with a red pigment is added wherein the red gel has is a less dense pigment than the first. When cooled, the gels convert to liquid and the green, being heavier, will fall due to gravity. The red liquid will then take over the window. This gives a color change from green to red to show there has been a temperature excursion below the threshold temperature. The color change is permanent and the indicator cannot be reused.

BRIEF DESCRIPTION OF DRAWINGS

FIG. 1 depicts a diagram of the invention in a first point in time prior to reaching a critical descending temperature.

FIG. 2 depicts another schematic of the invention after exposure to a critical descending temperature.

DETAILED DESCRIPTION OF PREFERRED EMBODIMENTS

Referring now to the drawings, a descending temperature indicator is generally referred to by the numeral 10. The temperature descending indicator 10 gives a visual indication when it has been exposed to temperatures below its set threshold temperature. The preferred embodiment uses a translucent or clear container 12, such as a low MVTR film blister 13, and which is filled with a first temperature sensitive gel substance 14 and a second temperature sensitive gel substance 16. The container 12 with gel substances 14 and 16 therein can be then sealed with a foil backing 18.

The gel substances 14 and 16 in the container 12 will convert to liquid when it is exposed to temperatures below the set threshold temperature. When the gel substances 14 and 16 convert to liquid, a permanent color change occurs. The color change is accomplished by loading first gel substance 14 having color (e.g. green) which contains high density pigment and then second gel substance 16 having a different color (e.g. red) which contains a lower density pigment into blister formed in a film to provide a cover or a small window 20 in front. The green gel substance 14 is seen when viewing the window 20.

Behind the green gel substance 14, the second red temperature sensitive gel substance 16 is naturally disposes itself below the green gel substance 14. When cooled, the gel substances 14 and 16 convert to liquid and the green heavy pigment, being heavier, will fall due to gravity. As seen, there is significantly more red gel substance 16 and this will dominate the color once the gel turns to liquid. The red lighter pigment will subsequently obscure the window 20. This gives a color change from green to red to indicate there has been a temperature excursion below the threshold temperature. The color change is permanent and the indicator cannot be reused.

The temperature sensitive gel substances 14 and 16 can include a sol-gel which is a high concentration solution of a block copolymer of polyethylene oxide (PEO) and polypropylene oxide (PPO) in water. These solutions form very rigid thermo-reversible gels that can quickly transition from gel to liquid over a narrow temperature range of less than 1° C. The unique phenomena of the sol-gel formation, is explained by the properties of the PPO and PEO groups in the polymer. At low temperatures, the PEO and PPO chains are soluble in water and exist as unimers. As the temperature rises, the PPO becomes less soluble and at the critical micelle temperature they form micelles. The solution is still liquid at this point. As temperature is increased, the micelles come in contact with each other and entanglement of the PEO groups on the outside of the micelle occurs. The micelles arrange themselves into lyotropic liquid crystalline structures (cubic, hexagonal, and/or lamellar). This forms a gel phase due to the restricted movement of the liquid crystalline structure. The temperature at which the solution transforms from gel to liquid is controlled by the molecular weight of the polymer, the ration of PEO to PPO in the polymer, and the concentration of the polymer in water. Also, additives can change the transition temperature based on their type and quantity. For example, addition of humectants reduces the transition temperature and addition of alcohols raises the transition temperature.

A method of obtaining a permanent and visible indication of when the gel transitions to liquid is by adding colorants of differing densities in sequential steps to a sol-gel substance and by positioning the two different colored sol-gel substances in a layered manner within the film blister pack such that only one colored gel substance is revealed prior to exposure to a critical descending temperature.

More particularly, to one portion of the gel, two high density pigments are added: barium sulfate and chromium oxide green. Because these two pigments have high densities, this gel substance 14 will be heavier than the red gel substance 16. The second portion of the gel substance 16 is formed with pigment red 2 being added to sol-gel which thus has a similar density to the neat gel (without additives). The green gel substance 14 is loaded first into the blister container 12 to cover a small clear window 20 in the front, so that only green is seen from the window 20. Behind the green, the red gel substance 16 with red pigment is added. The foil 18 is sealed to the blister cover edges 22 thereby forming the device 10 which here forms a label.

Upon exposure to the critical descending temperature, the gel shifts to liquid and the green, being heavier, will fall toward gravitational forces, and the red pigment will move adjacent the window 20 and obscure the green pigment. At the same time the red and green pigments mix, so that the green cannot flow back over the window due to change in position of the device 10. The change from green to red is an easily recognizable indication of the temperature excursion as green is associated with "go" and red with "stop." Other configurations, color changes, methods will be apparent to one skilled in the art.

Because the gel solution is water-based and the concentration of block polymer in solution determines the transition temperature, water cannot be lost from the container without affecting the response temperature of the label. In the preferred gel formula, a 2% loss of water (based on total weight of the gel) will result in approximately 1° C. reduction in response temperature. Therefore, the device 10 (label) can be ideally made from low water vapor transmission materials to have a reasonable shelf life. Aluminum foil is a perfect vapor barrier, having zero MVTR, so it can be used on the back of the label. The front, however, must be clear to allow viewing of the window with the colored gels behind it. A preferred clear film for low MVTR is Polychlorotrifluoroethylene (PCTFE). The thicker the PCTFE film, the better its barrier properties. 1 mil of PCTFE will transmit 0.15 $g/m^2$/day @38° C./90% RH. 4 mils of PCTFE will transmit 0.05 $g/m^2$/day @38° C./90% RH. A 3 to 4 mil film of PCTFE is preferred for this invention to provide ideal maximum product shelf life and maintain the accuracy of the label.

The blister film can preferably be rigid to prevent movement of the gel substances 14 and 16 within the container 12. PCTFE is flexible, so a blister made with just PCTFE would allow movement of the gel, which could cause a false activation of the label. For this reason, a PCTFE/Polyvinylchloride (PVC) laminate can preferably used. PVC provides rigidity and is easily formed. Also, aluminum foil with a heat seal coating can be bonded to PVC but not to PCTFE. So PVC also serves as the surface for bonding and printing.

Artwork can be applied to the film in many ways to provide a desired label. It can be printed onto a separate paper label and then applied to the film. It can be printed directly onto the PVC. It can also be applied to a separate film and laminated to the PVC/PCTFE film. The label art not only contains pertinent product information, it can also be used to create the window for viewing the colors. Print can be done all around the blister area except the clear center window 20. The print can also hide the red colored gel substance 16 that is behind the green gel. Below, the Red Pigmented Sol-Gel (second temperature sensitive non-liquid) can be provided in greater volume than the Green Pigmented Sol-Gel (first temperature sensitive non-liquid), for example.

Materials List/Formula:

| Base Sol-Gel | |
|---|---|
| Block copolymer of polyethylene oxide and polypropylene oxide | 20-50% |
| Deionized Water | 40-80% |
| Glycerin | 0-25% |
| Biocide | 0.025-0.4% |

| Green Pigmented Sol-Gel | |
|---|---|
| Base Sol-Gel | 60-95% |
| Chromium Oxide Green Pigment | 0.25-5% |
| Barium Sulfate Powder | 5-35% |

| Red Pigmented Sol-Gel | |
|---|---|
| Base Sol-Gel | 80-98% |
| Pigment Red 2 | 2-20% |

Packaging

Polychlorotrifluoroethylene Film, Polyvinylchloride film, Polyester Film which is Laminated and Aluminum Foil with Heat Seal Coating The above described embodiment(s) is set forth by way of example and is not for the purpose of limiting the present invention. It will be readily apparent to those skilled in the art that obvious modifications, derivations and variations can be made to the embodiment without departing from the scope of the invention. Accordingly, the claims appended hereto should be read in their full scope including any such modifications, derivations and variations.

What is claimed is:

1. A temperature descending indicator which gives a visual indication when the indicator has been exposed to temperatures below a set threshold temperature, which includes:
   a container having a translucent portion;
   a first temperature sensitive non-liquid of a first color which will convert to liquid when it is exposed to temperatures below the set threshold temperature; and
   a second temperature sensitive non-liquid of a second color which will convert to liquid when it is exposed to temperatures below the set threshold temperature, wherein said second temperature sensitive non-liquid is disposed adjacent said translucent portion in a manner to obscure the visibility of said first temperature sensitive non-liquid wherein said second temperature sensitive non-liquid includes a colorant of lesser density and said first temperature sensitive non-liquid includes a colorant of higher density and such that when said non-liquids convert to liquid, a permanent color change occurs from density shift of said colorants.

2. The temperature descending indicator of claim 1, said second temperature sensitive non-liquid is provided in greater volume than said first temperature sensitive non-liquid.

3. The temperature descending indicator of claim 1, wherein said second temperature sensitive non-liquid includes a red colorant and said first temperature sensitive non-liquid includes a green colorant.

4. The temperature descending indicator of claim 3, wherein said color change goes from green to red.

5. The temperature descending indicator of claim 3, wherein said second non-liquid includes from about 60-95% Base Sol-Gel, 0.25-5% Chromium Oxide Green Pigment and 5-35% Barium Sulfate Powder and said first non-liquid includes from about 80-98% Base Sol Gel, 2-20% and Pigment Red 2.

6. The temperature descending indicator of claim 1, wherein said temperature sensitive non-liquids include a sol-gel.

7. The temperature descending indicator of claim 1, wherein said container includes a translucent film and an opaque backing which sealably contains said non-liquids.

8. The temperature descending indicator of claim 7, wherein said film includes a laminate of PCTFE, Polychlorotrifluoroethylene, and polyvinylchloride.

9. The temperature descending indicator of claim 7, wherein said translucent film is a low moisture vapor transfer rate material.

10. The temperature descending indicator of claim 1, wherein said indicator is operable at temperatures as low as −10 degrees C.

11. The temperature descending indicator of claim 1, wherein said second temperature sensitive non-liquid includes additives giving said second temperature sensitive non-liquid a given density and said first temperature sensitive non-liquid includes additives giving said first temperature sensitive non-liquid one of a lower and a higher given density than said second temperature sensitive non-liquid.

12. A method of forming a temperature indicator, which includes:
   providing a blister film container having a translucent portion,
   loading a first color temperature sensitive non-liquid that contains high density pigment into said blister film container in a position to cover said translucent portion wherein said first color temperature sensitive non-liquid will convert to liquid when it is exposed to temperatures below a set threshold temperature,
   loading a second color temperature sensitive non-liquid that contains lower density pigment into said blister film container adjacent said first color temperature sensitive non-liquid in a position such that only said first color temperature sensitive non-liquid is seen when viewing through said translucent portion and wherein said second color temperature sensitive non-liquid will convert to liquid when it is exposed to temperatures below the set threshold temperature and such that when said non-liquids convert to liquid, a permanent color change occurs from density shift of said colorants, and
   providing a backing onto said container to seal said temperature sensitive non-liquids in their positions.

13. The method of claim 12, wherein said non-liquids are sensitive to a descending temperature rendering said non-liquids liquid.

14. The method of claim 12, wherein said backing is opaque.

15. The method of claim 12, wherein said temperature sensitive non-liquids include a sol-gel.

16. The method of claim 12, wherein said indicator is constructed of low MVTR translucent polymer film and opaque backing to form a package with low MVTR and long shelf life.

* * * * *